United States Patent
Wang et al.

(10) Patent No.: US 10,740,612 B2
(45) Date of Patent: Aug. 11, 2020

(54) LOCATION DETERMINATION

(71) Applicant: International Business Machines Corporation, Armonk, NY (US)

(72) Inventors: Jian Jun Wang, Xian (CN); Juan Rao, Pudong (CN); Na L. Nie, Xian (CN); Ya Wei Guo, Xian (CN)

(73) Assignee: International Business Machines Corporation, Armonk, NY (US)

( * ) Notice: Subject to any disclaimer, the term of this patent is extended or adjusted under 35 U.S.C. 154(b) by 42 days.

(21) Appl. No.: 15/654,962

(22) Filed: Jul. 20, 2017

(65) Prior Publication Data

US 2019/0026556 A1 Jan. 24, 2019

(51) Int. Cl.
*G06K 9/00* (2006.01)
*G06K 9/32* (2006.01)
(Continued)

(52) U.S. Cl.
CPC ......... *G06K 9/00671* (2013.01); *G01C 21/20* (2013.01); *G06F 16/583* (2019.01); *G06F 16/5866* (2019.01); *G06K 9/00476* (2013.01); *G06K 9/00624* (2013.01); *G06K 9/00979* (2013.01); *G06K 9/3208* (2013.01);
(Continued)

(58) Field of Classification Search
CPC ............ G06K 9/6201; G06K 9/00664; G06K 9/6215; G06K 9/00624; G06K 9/00637; G06K 9/00684; G06K 9/00771; G06K 9/00791; G01C 21/20
See application file for complete search history.

(56) References Cited

U.S. PATENT DOCUMENTS 6,756,913 B1 6/2004 Ayed
8,442,848 B2 5/2013 Myr
(Continued)

FOREIGN PATENT DOCUMENTS

CN 102651167 A 8/2012
CN 103249142 A 8/2013
(Continued)

OTHER PUBLICATIONS

Wu et al., "To Taxi or Not to Taxi?—Enabling Personalised and Real-Time Transportation Decisions for Mobile Users", 2012 IEEE 13th International Conference on Mobile Data Management, © 2012 IEEE, 4 pages, DOI 10.1109/MDM.2012.55.
(Continued)

Primary Examiner — Kenny A Cese
(74) Attorney, Agent, or Firm — Richard B. Thomas

(57) ABSTRACT

Returning a location for a device is accomplished by receiving a first image, captured by a device, and a first orientation of the device from the device over one or more networks. A second image, captured by the device, and a second orientation of the device is received from the device over one or more networks. A first location of a first object included in the first image and a second location of a second object included in the second image can be determined respectively from a database of object locations. A location of the device is determined according to the first orientation, the second orientation, the first location of the first object and the second location of the second object. The device location is transmitted to the device.

20 Claims, 6 Drawing Sheets

(51) Int. Cl.
  *G06K 9/62*     (2006.01)
  *G01C 21/20*    (2006.01)
  *G06F 16/583*   (2019.01)
  *G06F 16/58*    (2019.01)
  *H04N 1/32*     (2006.01)
  *G06F 16/29*    (2019.01)

(52) U.S. Cl.
  CPC ....... *G06K 9/6202* (2013.01); *H04N 1/32101* (2013.01); *G06F 16/29* (2019.01)

(56) References Cited

U.S. PATENT DOCUMENTS

| | | | | |
|---|---|---|---|---|
| 8,933,993 | B1* | 1/2015 | Flynn | G06T 7/80 |
| | | | | 348/46 |
| 9,157,748 | B2 | 10/2015 | Millspaugh | |
| 2013/0194428 | A1* | 8/2013 | Chao | G01C 21/20 |
| | | | | 348/159 |
| 2013/0236107 | A1* | 9/2013 | Fukaya | G06K 9/46 |
| | | | | 382/201 |
| 2014/0118536 | A1* | 5/2014 | Morin | H04N 1/32117 |
| | | | | 348/135 |

FOREIGN PATENT DOCUMENTS

| | | |
|---|---|---|
| CN | 103903428 A | 7/2014 |
| CN | 106289263 A | 1/2017 |
| WO | 2008094126 A2 | 8/2008 |
| WO | 2013036199 A1 | 3/2013 |
| WO | 2016134509 A1 | 9/2016 |

OTHER PUBLICATIONS

Yuan et al., "Where to Find My Next Passenger?", Paper Session: On the Move, UbiComp'11 / Beijing, China, Sep. 17-21, 2011, Copyright 2011 ACM 978-1-4503-0630-0/11/09, 10 pages.

International Search Report and Written Opinion dated Oct. 31, 2018 for International Application No. PCT/IB2018/054954 filed Jul. 5, 2018.

* cited by examiner

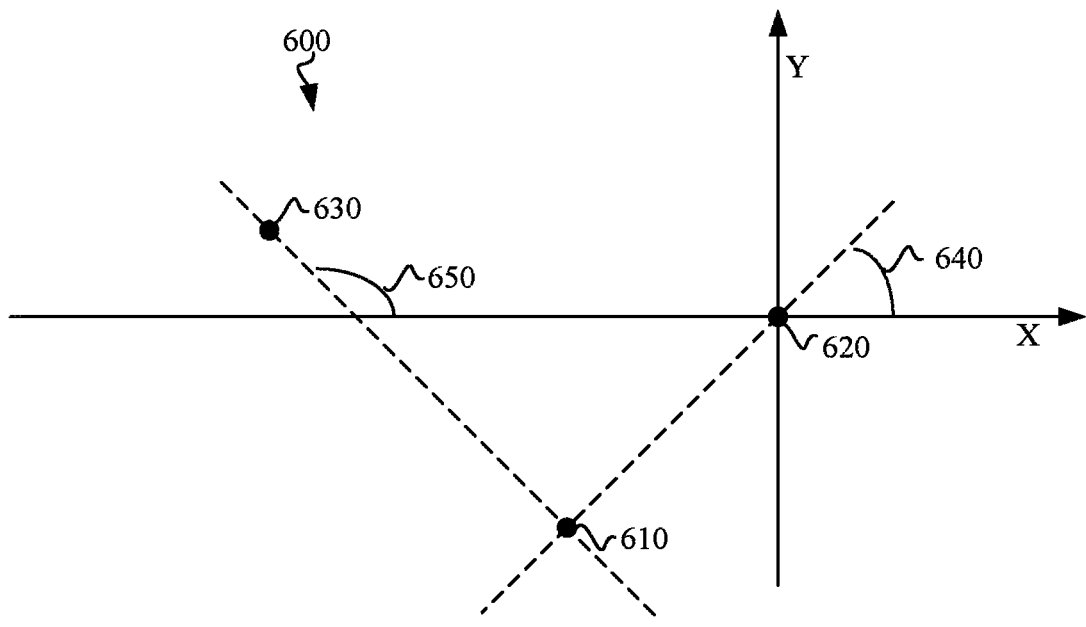

FIG. 6

```
┌─────────────────────────────────────────────────────────┐
│  OBTAIN A FIRST IMAGE USING A DEVICE AND DETERMINE A    │
│  FIRST ORIENTATION OF THE DEVICE                        │
│                          710                            │
└─────────────────────────────────────────────────────────┘
                             │
                             ▼
┌─────────────────────────────────────────────────────────┐
│  OBTAIN A SECOND IMAGE USING THE DEVICE AND DETERMINE A │
│  SECOND ORIENTATION OF THE DEVICE                       │
│                          720                            │
└─────────────────────────────────────────────────────────┘
                             │
                             ▼
┌─────────────────────────────────────────────────────────┐
│  DETERMINE A FIRST LOCATION OF A FIRST OBJECT INCLUDED  │
│  IN THE FIRST IMAGE AND A SECOND LOCATION OF A SECOND   │
│  OBJECT INCLUDED IN THE SECOND IMAGE                    │
│                          730                            │
└─────────────────────────────────────────────────────────┘
                             │
                             ▼
┌─────────────────────────────────────────────────────────┐
│  DETERMINE LOCATION OF THE DEVICE ACCORDING TO THE      │
│  FIRST ORIENTATION, THE SECOND ORIENTATION, THE FIRST   │
│  LOCATION OF THE FIRST OBJECT, AND THE SECOND LOCATION  │
│  OF THE SECOND OBJECT                                   │
│                          740                            │
└─────────────────────────────────────────────────────────┘
```

FIG. 7

LOCATION DETERMINATION

BACKGROUND

The present disclosure relates to positioning technology, and more specifically, to determining locations of mobile devices.

Nowadays, positioning technology is used more and more extensively. For example, when a user wants to book a taxi, a driver of the modern taxi may need to know the user's location. Global Positioning System (GPS) or other satellite-based positioning systems can be used for determining the user's location. Generally, a GPS receiver requires at least three (3) accessible satellite signals to calculate the receiver's position.

SUMMARY

According to one embodiment of the present disclosure, there is provided a method for returning a location for a device. In accordance with the method, a first image, captured by a device, can be received from the device over one or more networks. A first orientation of the device can be received from the device over one or more networks. A second image, captured by the device, can be received from the device and a second orientation of the device can be received from the device over one or more networks. A first location of a first object included in the first image and a second location of a second object included in the second image can be determined respectively from a database. The database can contain a plurality of object locations. A location of the device can be determined according to the first orientation, the second orientation, the first location of the first object and the second location of the second object. The device location can be transmitted to the device.

According to another embodiment of the present disclosure, there is provided a computer system. The computer system comprises a processor and a computer-readable memory coupled to the processor. The memory comprises instructions that when executed by the processor to perform the actions of: receiving a first image captured by a device and a first orientation of the device from the device over one or more networks; receiving a second image captured by the device and a second orientation of the device from the device over the one or more networks; determining a first location of a first object included in the first image and a second location of a second object included in the second image from a database containing a plurality of object locations; determining a location of the device according to the first orientation, the second orientation, the first location of the first object and the second location of the second object, and transmitting the location of the device to the device.

According to another embodiment of the present disclosure, there is provided a computer program product. The computer program product comprises a computer readable storage medium having program instructions embodied therewith, the program instructions executable by a processor to cause the processor to: receive a first image captured by a device and a first orientation of the device from the device over the one or more networks; receive a second image captured by the device and a second orientation of the device from the device over the one or more networks; determine a first location of a first object included in the first image and a second location of a second object included in the second image from a database containing a plurality of object locations; determine a location of the device according to the first orientation, the second orientation, the first location of the first object and the second location of the second object, and transmitting the location of the device to the device.

According to another embodiment of the present disclosure, there is provided a computer-implemented method for returning a location for a device. According to the method, a first image captured by a device and a first orientation of the device is transmitted to a server over one or more networks. A second image captured by the device and a second orientation of the device is transmitted to a server over one or more networks. A first location of a first object included in the first image is received over the one or more networks. A second location of a second object included in the second image is received over the one or more networks. The first location and the second location can be identified using a database of object locations. A device location of the device is determined according to the first orientation, the second orientation, the first location of the first object and the second location of the second object.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 6 shows another example coordinate system according to an embodiment of the present disclosure.

FIG. 7 is a flowchart of an example method for positioning according to an embodiment of the present disclosure.

Figure 1:
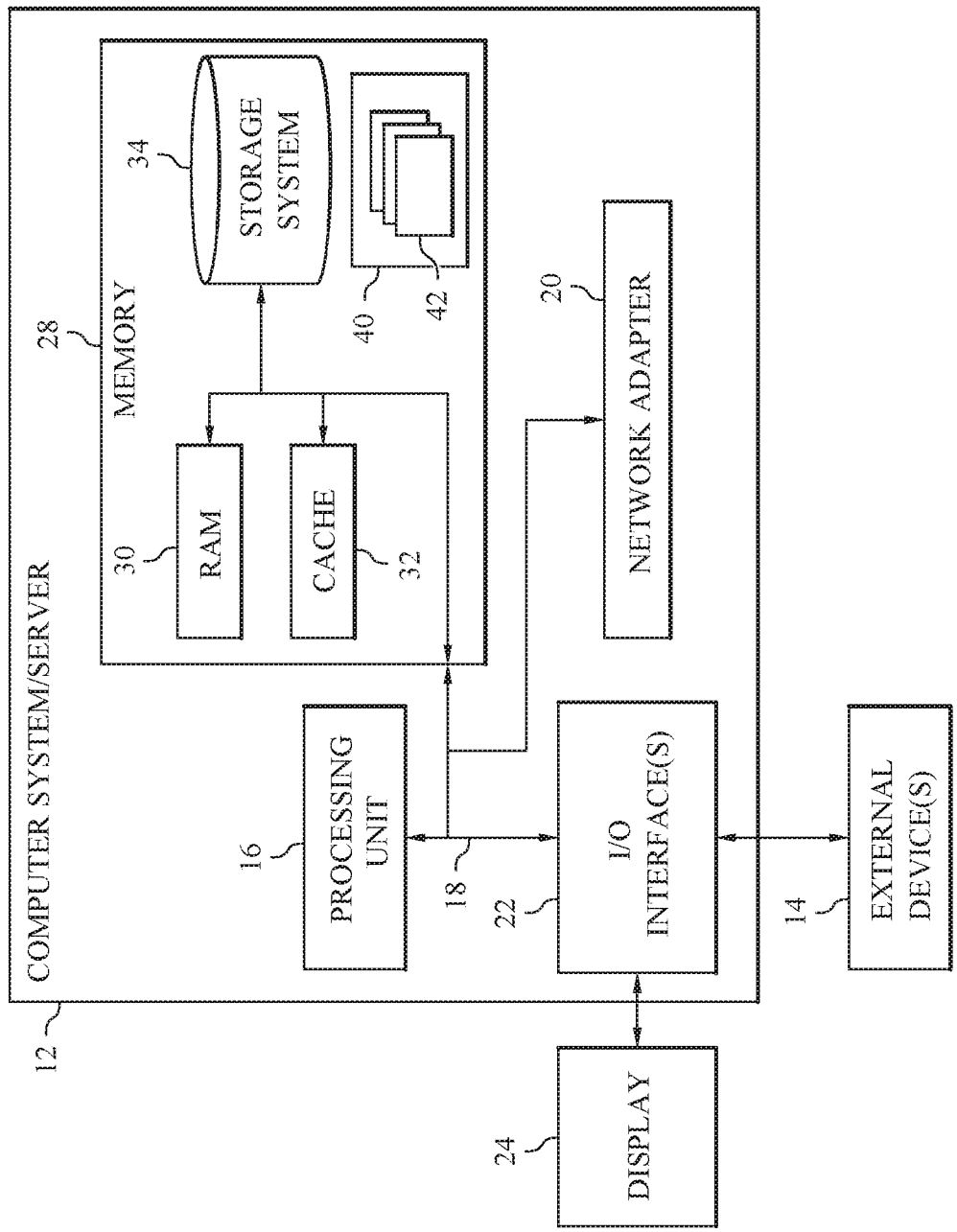
FIG. 1 depicts a cloud computing node according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to positioning technology, and more particular aspects relate to determining locations of mobile devices. While the present disclosure is not necessarily limited to such applications, various aspects of the disclosure may be appreciated through a discussion of various examples using this context.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
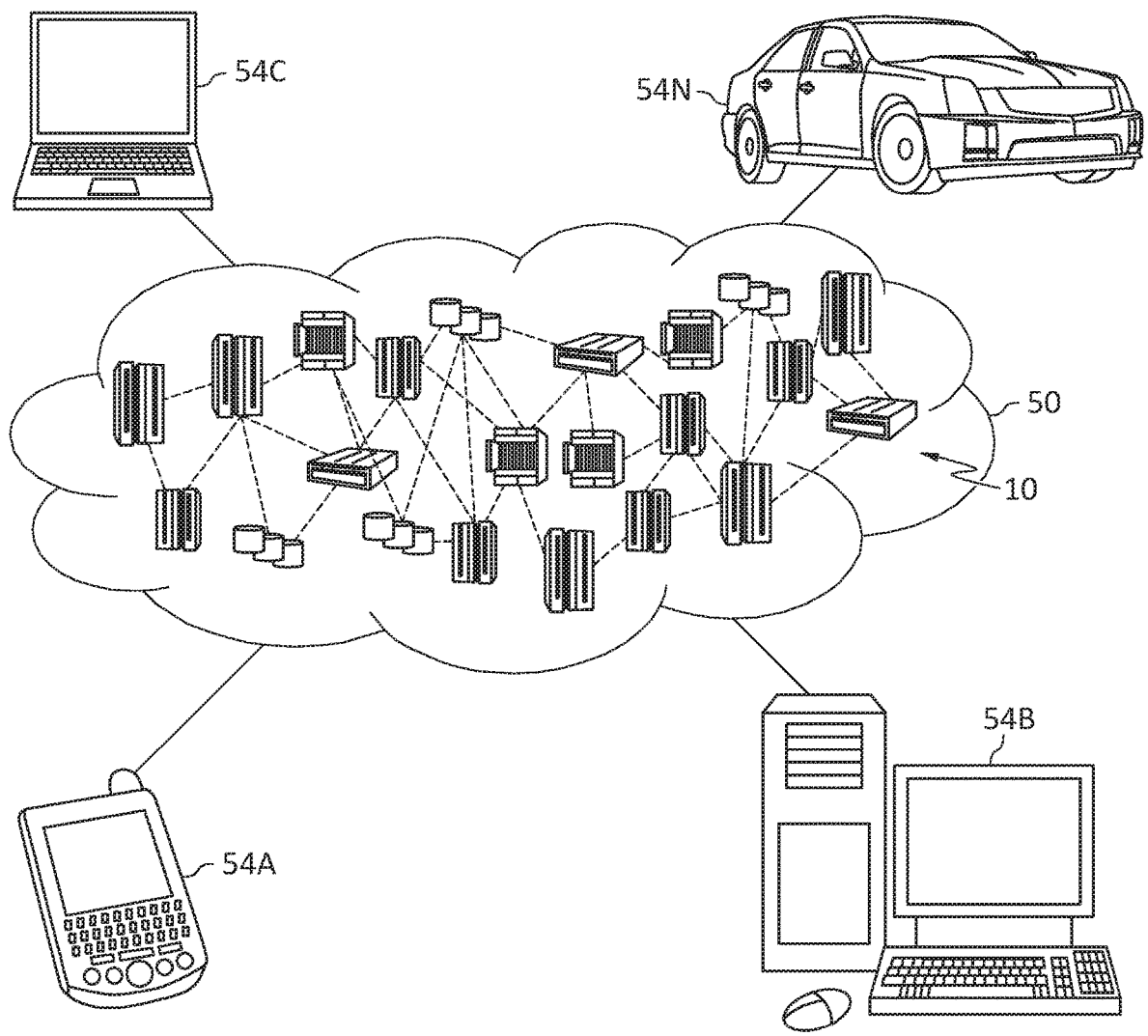
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
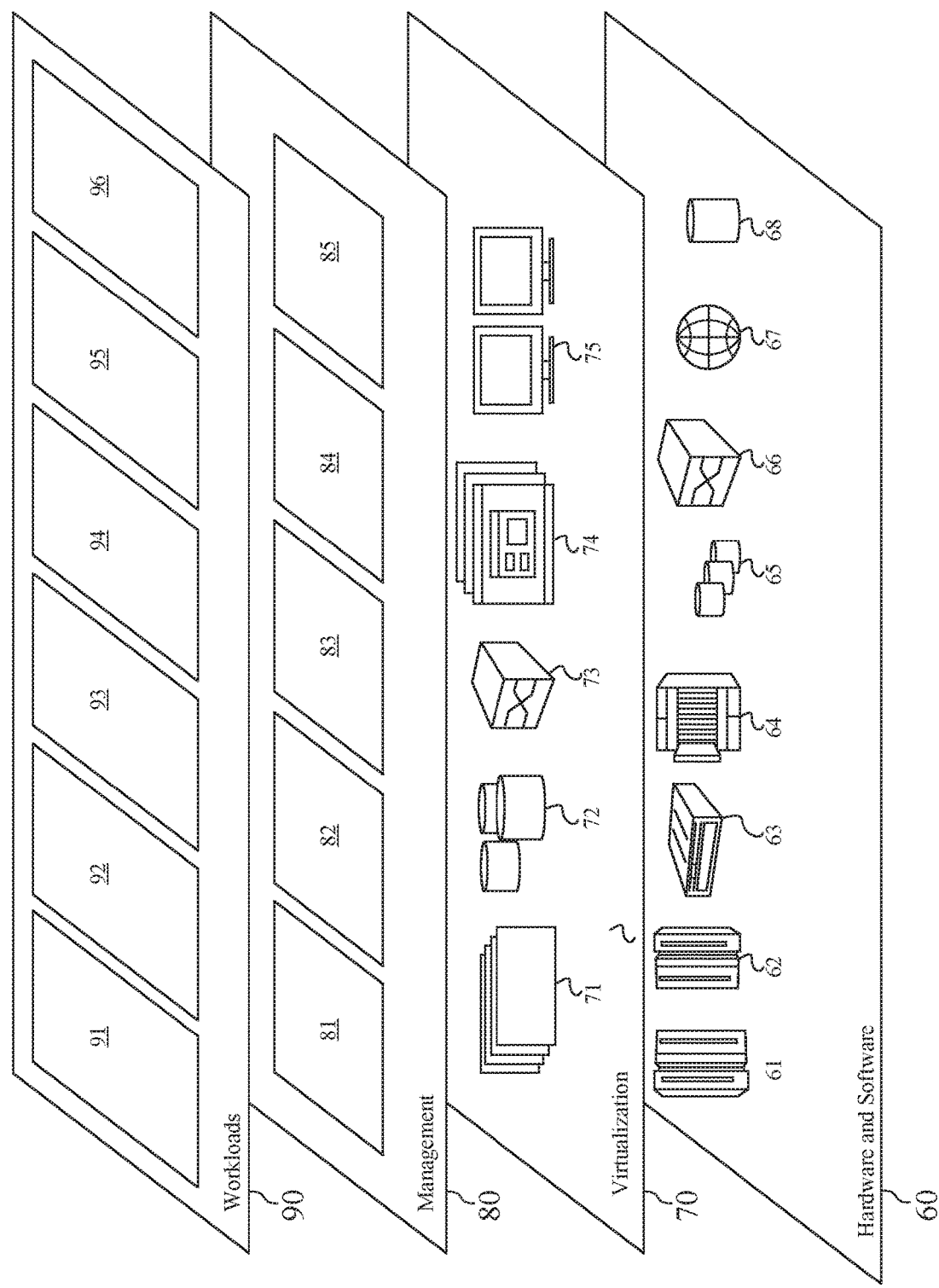
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and positioning 96.

Nowadays, there is an increasing need for positioning technology. For example, when a user wants to book a taxi, a driver of the taxi may need to know the user's location. The user's location can be determined using a device, such as mobile phone used by the user. The location of the device can be regarded as the user's location. GPS or other satellite-based positioning system can be used for determining the user's location. However, GPS or other satellite-based positioning system are not perfect and cannot work stably in some cases. For example, a GPS system requires satellite signal of adequate strength and at least 3 positioning satellites to be detected by the mobile device to provide positioning services. Moreover, there may be conditions which compromise the accuracy of the GPS system.

Figure 4:
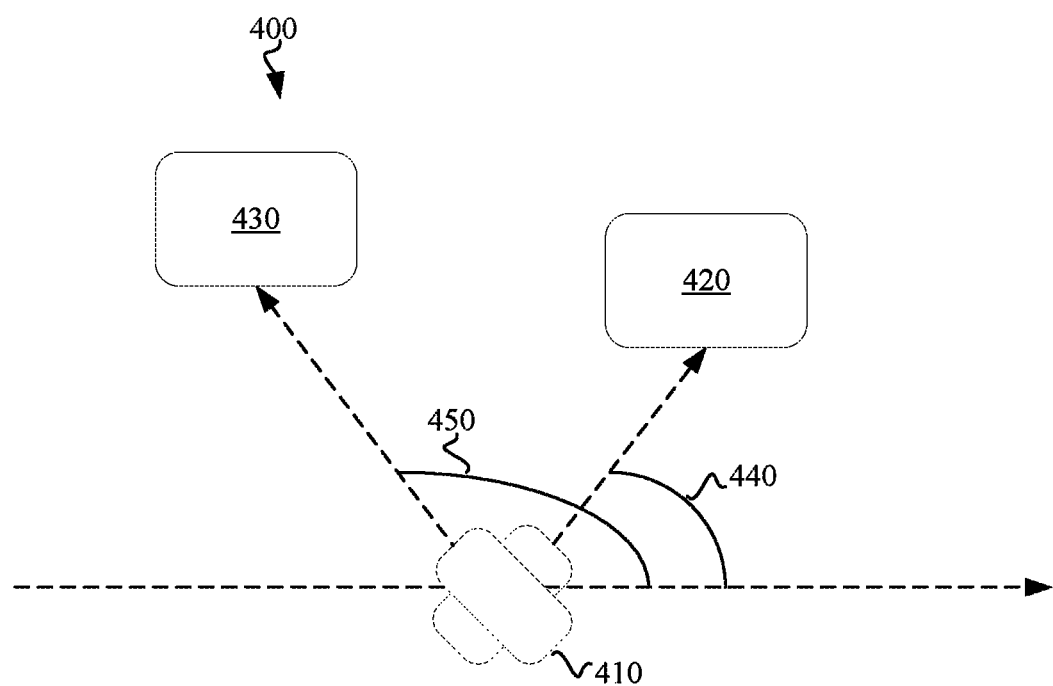
FIG. 4 is a schematic diagram illustrating an example environment according to an embodiment of the present disclosure.

FIG. 4 shows a schematic diagram of an environment 400 for determining a location of a device 410 in accordance with an embodiment of the disclosure. The device 410 can be a mobile device, a handheld device, a mobile phone, a smart phone, a camera, a laptop, a tablet, a walkie-talkie, a Personal Digital Assistant (PDA), or any other types of devices now known or to be developed suitable for applying the positioning technology of the present disclosure. The device 410 can be carried by a user or deployed in a vehicle. The device 410 can comprise a photographing apparatus suitable for obtaining images, or photos. The photographing apparatus can comprise a camera. The device 410 can also comprise sensors for determining the orientation of the device 410. The sensors can be a digital compass, a gyroscope, or other directional apparatus now known or to be developed.

To determine the location of the device 410, at least two images can be obtained using the photographing apparatus of the device 410. The at least two images can be obtained at a same location, or at two locations near enough to one another to be considered a singular location by a positioning system. For example, after obtaining the first image, the device can rotate an angle, and then the second image can be obtained. The at least two images can comprise a first image and a second image. At least one subject can be identified respectively in each of the first image and the second image. In an example, a first object 420 identified in the first image can be a restaurant, and a second object 430 identified in the second image can be a hotel.

In addition to obtaining the first image, a first orientation 440 of the device can be determined. In addition to obtaining the second image, a second orientation 440 of the device can be determined. According to various embodiments of the disclosure, the step of obtaining the first image or the second image can be implemented before, simultaneously, or after the step of obtaining the first orientation 440 or the second orientation 450. In an example, in parallel with photographing the first object 420 and the second object 430 using the photographing apparatus of the device 410, the first orientation 440 and the second orientation 450 can be obtained.

The first orientation 440 can be an angle between the axial direction of the device and a reference direction when photographing the first object 420 using the photographing apparatus. The second orientation 450 can be an angle between the axial direction of the device and a reference direction when photographing the second object 430. According to various embodiments of the disclosure, the reference direction can be east, or any other direction set or selected by the device 410, a user, applications running on the device, local or remote servers, or a service provider, etc. The axial direction of the device can be the direction from the device toward the first object 420 or the second object 430 respectively.

According to various embodiments of the present disclosure, a marker or identifier can be shown on a display apparatus of the device 410 during photographing images using the photographing apparatus of the device 410. As an example, the device 410 can be twisted to photograph the first object 420 and/or the second object 430. If the object 420 or the object 430 shown on the display apparatus matches the marker or the identifier shown on the display apparatus during the photographing, the angle between the axial direction of the device 410 and the reference direction can be recorded respectively as the first orientation 440 or the second orientation 450.

According to various embodiments of the present disclosure, a sensor of the device 410 can also be used to determine the first orientation 440 and the second orientation 450 of the device 410. If the object 420 or the object 430 shown on the display apparatus matches the marker or the identifier shown on the display apparatus during the photographing, the sensor can be used to determine orientations of the device 410, and the orientations obtained using the sensor can be recorded respectively as the first orientation 440 or the second orientation 450.

Locations of the first object 420 and the second object 430 can be obtained. According to various embodiments of the present disclosure, the step of obtaining the location of the first object or the location of the second object can be implemented before, simultaneously, or after the step of obtaining the first orientation 440 or the second orientation 450. The location may be retrieved from a database of object locations, e.g. a cloud server with a stored street view map, according to embodiments.

According to various embodiments of the present disclosure, locations of different buildings or other types of landmarks can be previously obtained and recorded in a database. Records in the database can comprise identifiers of building or landmarks, images of buildings or landmarks, or locations of these buildings or landmarks, etc. The database may be stored in the device itself or may be in a remote storage, such as a cloud storage. For example, in embodiments a street view map server may serve as the database. In such embodiments, the photographs of the first object and the second object may be uploaded to the server via one or more networks. In embodiments, the photographs may be converted into black-and-white before uploading. In response to obtaining the first image and the second image, the first object 420 and the second object 430 can be identified respectively in the first image and the second image using various types of image identifying technologies now known or to be developed. Identifiers of the first object 420 and the second object 430 can be determined and matched respectively with the records in the database. Database records may include various location images and associated location data. Location data can, in embodiments, include stored GPS data. In response to finding corresponding records, the locations of first object 420 and second object 430 can be determined respectively based on the corresponding records. In another example, a region comprising the first object 420 in the first image can be compared with images of the records in the database.

According to various embodiments of the present disclosure, user input can be also used for identifying the first object 420 and/or the second object 430. For example, if a user is familiar with the building or landmark photographed, the user can input the name or other information of the building or landmark to contribute in the identifying the first object 420 and/or the second object 430. According to various embodiments of the present disclosure, if the first location of the first object 420 is not obtained or the second location of the second object 430 is not obtained from the database, a notification can be presented to the user of the device 410. As an example, the notification can be a notification message shown on the display apparatus of the device 410. In another example, the notification message can be sent from a server to the device 410 and then shown on the display apparatus of the device 410.

Figure 5:
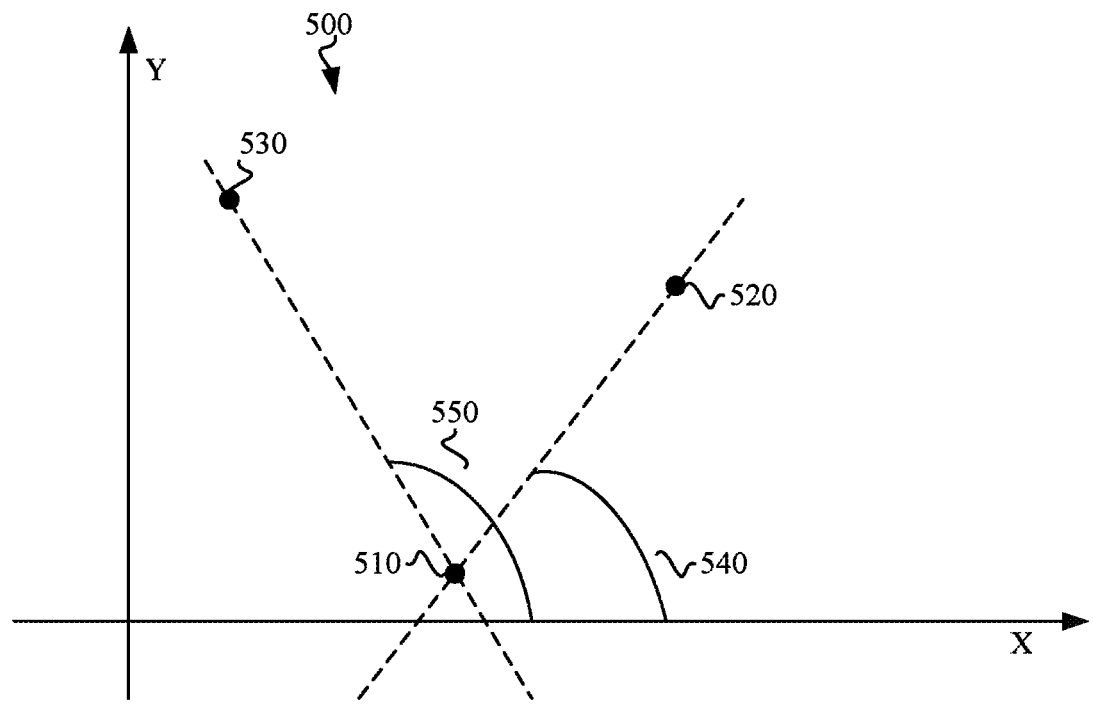
FIG. 5 shows an example coordinate system according to an embodiment of the present disclosure.

FIG. 5 shows a schematic diagram of an example coordinate system 500 for determining the location of the device 410 in accordance with an embodiment of the present disclosure. In an example, locations of the first object 420 and the second object 430 can be mapped to a first point 520 and a second point 530 in a coordinate system. As an example, the coordinate system can be dynamically established by selecting a reference location as the origin 510 of the coordinate system, selecting the reference direction as the X axis of the coordinate system, and selecting the direction perpendicular to the X axis (the reference direction) as the Y axis of the coordinate system. In another example, the coordinate system can be established by selecting a direction with an angle from the reference direction as the X axis of the coordinate system.

According to various embodiments of the present disclosure, locations of the first object 420 and the second object 430 can be represented with longitudes and latitudes, or any other formats suitable to present a location now known or to be developed. A reference location can be selected and set as the origin 510 of the coordinate system. In an example, the reference location can be a location near to the locations of the first object 420 and the second object 430. The difference between (Longitude 1, Latitude 1) of the first object 420 and (Longitude 3, Latitude 3) of the reference location can be set as the x-coordinate and y-coordinate of the first point 520. The difference between (Longitude 2, Latitude 2) of the second object 430 and (Longitude 3, Latitude 3) of the reference location can be set as the x-coordinate and y-coordinate of the second point 530. The mapping between locations and coordinates is shown in Table 1 as an example. Other types of mapping methods can also be used to map the locations and the coordinates. For example, longitudes and latitudes of locations can be represented with numbers, and these numbers can be multiplied with a constant previously set to obtain coordinates in the coordinate system. The constant can be any value which matches the accuracy requirement of the coordinate system.

TABLE 1

Mapping between locations and coordinates

| | Locations | Coordinates |
|---|---|---|
| Location of the first object 420 | (Longitude 1, Latitude 1) | (Longitude 1 − Longitude 3, Latitude 1 − Latitude 3) |
| Location of the second object 430 | (Longitude 2, Latitude 2) | (Longitude 2 − Longitude 3, Latitude 2 − Latitude 3) |
| Reference location | (Longitude 3, Latitude 3) | (0, 0) |

A first line and a second line can be determined according to the first orientation 440 and the second orientation 450 in the coordinate system. The first line passes the first point 520 and the angle 540 between and the first line and the X axis of the coordinate system equals to first orientation 440. The second line passes the second point 530 and the angle 550 between and the second line and the X axis equals to second orientation 450. The first line and the second line may meet each other at the intersection point 510. The x-coordinate and y-coordinate of the intersection point 510 can be determined and then mapped to a location. As a point in the coordinate system corresponds to a location, the location of the device 410 can be obtained according to the x-coordinate and y-coordinate of the intersection point 510.

According to various embodiments of the present disclosure, x-coordinate and y-coordinate of the intersection point 510 in a coordinate system according to the following formula:

$$X_c = (Y_b - \tan\theta_1 \cdot X_b - Y_a + \tan\theta_2 \cdot X_a)/(\tan\theta_2 - \tan\theta_1),$$

$$Y_c = \tan\theta_2 \cdot X_c + Y_a - \tan\theta_2 X_a,$$

wherein $X_c$ is the x-coordinate of the intersection point 510, $Y_c$ is the y-coordinate of the intersection point 510; $X_a$ is the x-coordinate of the first point 520, $Y_a$ is the y-coordinate of the first point 520; $X_b$ is the x-coordinate of the second point 530, $Y_b$ is the y-coordinate of the second point 530; $\theta_1$ equals the first orientation 440 of the device; $\theta_2$ equals the second orientation 450 of the device. The location of the device 410 can be obtained according to the x-coordinate and y-coordinate of the intersection point 510. The mapping between coordinates and locations is shown in Table 2 as an example. Other types of mapping methods can also be used to map the coordinates and the locations.

TABLE 2

Mapping between coordinates and locations

| | Locations | Coordinates |
|---|---|---|
| Reference location | (0, 0) | (Longitude 3, Latitude 3) |
| Location of the device 410 | ($X_c$, $Y_c$) | (Longitude 3 + $X_c$, Latitude 3 + $Y_c$) |

According to various embodiments of the present disclosure, locations can be represented with coordinates in a coordinate system. In an example, origin, X axis, and Y axis of the coordinate system can be previously set, and coordinates of locations of different buildings or landmarks can be recorded in a database. In responding to identifying the first object 420 and the second object 430, coordinates of the locations of the first object 420 and the second object 430 can be directly obtained from the database. Referencing FIG. 5, the locations of the first object 420 and the second object 430 correspond to the first point 520 and the second point 530 in the coordinate system.

A first line and a second line can be determined according to the first orientation 440 and the first orientation 450 in the coordinate system. The first line passes the first point 520 and the angle 540 between the first line and the X axis of the coordinate system is determined according to the first orientation 440. The second line passes the second point 530 and the angle 550 between the second line and the X axis is determined according to the second orientation 450.

In an example, the reference direction can be same to the X axis direction of the coordinate system, the angle 540 equals to the first orientation 440 and the angle 550 equals the second orientation 450. In another example, there is a difference between the reference direction and the X axis direction, and the difference can be considered with the first orientation 440 or the second orientation 450 to obtain the angle 540 and angle 550. For example, if the X axis direction is the East direction, and the reference direction is East to North 10 degrees, so the difference is 10 degrees, and the first orientation 440 can be added with the difference to obtain the angle 540. In another example, if the X axis direction is the East direction, and the reference direction is East to South 10 degrees, so the difference is −10 degrees.

The first line and the second line may meet each other at the intersection point 510. The x-coordinate and y-coordinate of the intersection point 510 can be determined. As a point in the coordinate system corresponds to a location, the location of the device 410 can be determined.

According to various embodiments of the present disclosure, x-coordinate and y-coordinate of the intersection point 510 in a coordinate system according to the following formula:

$$X_c = (Y_b - \tan\theta_1 \cdot X_b - Y_a + \tan\theta_2 \cdot X_a)/(\tan\theta_2 - \tan\theta_1),$$

$$Y_c = \tan\theta_2 \cdot X_c + Y_a - \tan\theta_2 X_a,$$

wherein $X_c$ is the x-coordinate of the intersection point 510, $Y_Y$ is the y-coordinate of the intersection point 510; $X_a$ is the x-coordinate of the first point 520, $Y_a$ is the y-coordinate of the first point 520; $X_b$ is the x-coordinate of the second point 530, $Y_b$ is the y-coordinate of the second point 530; $\theta_1$ is determined according to the first orientation 440 of the device; $\theta_2$ is determined according to the second orientation 450 of the device. In an example, the reference direction can be same to the X axis direction of the coordinate system, $\theta_1$ equals to the first orientation 440 and $\theta_2$ equals the second orientation 450. In another example, there is a difference between the reference direction and the X axis direction, and the difference can be added to the first orientation 440 or the second orientation 450 to obtain $\theta_1$ and $\theta_2$.

FIG. 6 shows a schematic diagram of another example coordinate system 600 for determining the location of a device 410 in accordance with an embodiment of the present disclosure. Locations of the first object 420 and the second object 430 can be mapped to a first point 620 and a second point 630 in a coordinate system. As an example, the coordinate system can be established by selecting the first point 620 as the origin 510 of the coordinate system, selecting the reference direction as the X axis of the coordinate system, and selecting the direction perpendicular to the X axis (the reference direction) as the Y axis of the coordinate system. In another example, the coordinate system can be established by selecting a direction with an angle from the reference direction as the X axis of the coordinate system.

According to various embodiments of the present disclosure, locations of the first object 420 and the second object 430 can be represented with longitude and latitude, or any other formats suitable to present a location now known or to be developed. Differences between (Longitude 2, Latitude 2) of the location of the second object 430 and (Longitude 1, Latitude 1) of the location of the first object 420 can be set as the x-coordinate and y-coordinate of the second point 630. The mapping between locations and coordinates is shown in Table 3 as an example. Other types of mapping methods can also be used to map the locations and the coordinates. For example, longitudes and latitudes of locations can be represented with numbers, and these numbers can be multiplied with a constant previously set to obtain coordinates in the coordinate system. The constant can be any value needed.

TABLE 3

Mapping between locations and coordinates

| | Locations | Coordinates |
|---|---|---|
| Location of the first object 420 | (Longitude 1, Latitude 1) | (0, 0) |
| Location of the second object 430 | (Longitude 2, Latitude 2) | (Longitude 2 − Longitude 1, Latitude 2 − Latitude 1) |

A first line and a second line can be determined according to the first orientation 440 and the second orientation 450 in the coordinate system. The first line passes the first point 620 (the origin of the coordinate system) and the angle 640 between and the first line and the X axis of the coordinate system equals to first orientation 440. The second line passes the second point 630 and the angle 650 between and the second line and the X axis equals to second orientation 450. The first line and the second line may meet each other at the intersection point 610. The x-coordinate and y-coordinate of the intersection point 610 can be determined and then mapped to a location. The location of the device 410 can be obtained according to the x-coordinate and y-coordinate of the intersection point 610.

According to various embodiments of the present disclosure, x-coordinate and y-coordinate of the intersection point 610 in a coordinate system according to the following formula:

$$X_c = (Y_b - \tan\theta_1 * X_b)/(\tan\theta_2 - \tan\theta_1),$$

$$Y_c = \tan\theta_2 * X_c,$$

wherein $X_c$ is the x-coordinate of the intersection point 610, $Y_c$ is the y-coordinate of the intersection point 610; $X_b$ is the x-coordinate of the second point 630, $Y_b$ is the y-coordinate of the second point 630; $\theta_1$ equals the first orientation 440 of the device; $\theta_2$ equals the second orientation 450 of the device.

FIG. 7 is a flowchart of an example method 700 for positioning according to an embodiment of the present disclosure. According to various embodiments of the present disclosure, the method 700 can be implemented by the device 410, or another device near the device 410. In another example, some steps of the method can be implemented by the device 410 or another device near the device 410, and some steps of the method can be implemented at a local or remote server which the device 410 is in communication with over one or more networks. In some circumstances, the method can be implemented jointly by one or more of the device 410, another device near the device 410, and a local or remote server.

At block 710, a first image can be obtained using a device; and a first orientation of the device can be determined. At block 720, a second image can be obtained using the device, and a second orientation of the device can be determined.

In an example, the first image and the second image can be obtained using the photographing apparatus of the device. The at least two images can be obtained at a same location, or at two locations generally near enough to one another to be considered a singular location by a positioning system. The first orientation can be an angle between the axial direction of the device and a reference direction when photographing the first object using the photographing apparatus. The second orientation can be an angle between the axial direction of the device and a reference direction when photographing the second object.

At block 730, a first location of a first object included in the first image and a second location of a second object included in the second image can be determined from a street view database. At block 740, the location of the device can be determined according to the first orientation, the second orientation, the first location of the first object and the second location of the second object.

It is to be understood that sequences of these steps (obtaining the first image, obtaining the second image, determining the first orientation, determining the second orientation, determining the first location, determining the second location etc.) are optional. For example, the step of determining the first orientation or determining the second orientation can be implemented before, simultaneously or after the step of obtaining the first image or obtaining the second image. The step of determining the first location or determining the second location can also be implemented before, simultaneously or after the step of obtaining the first orientation or obtaining the second orientation.

In some embodiments of the present disclosure, a third image can also be obtained using the device, and a third orientation of the device can be determined. Then, a third location of a third object included in the third image can be determined. A first location of the device can be determined according to the first orientation, the second orientation, the first location of the first object and the second location of the second object using various methods of the present disclosure. A second location of the device can be determined according to the first orientation, the third orientation, the first location of the first object and the third location of the third object using the various methods of the present disclosure. Then, the location of the device can be obtained using the first location of the device and the second location of the device. For example, the intermediate location of the first location of the device and the second location of the device can be calculated and used as the location of the device.

Figure 8:
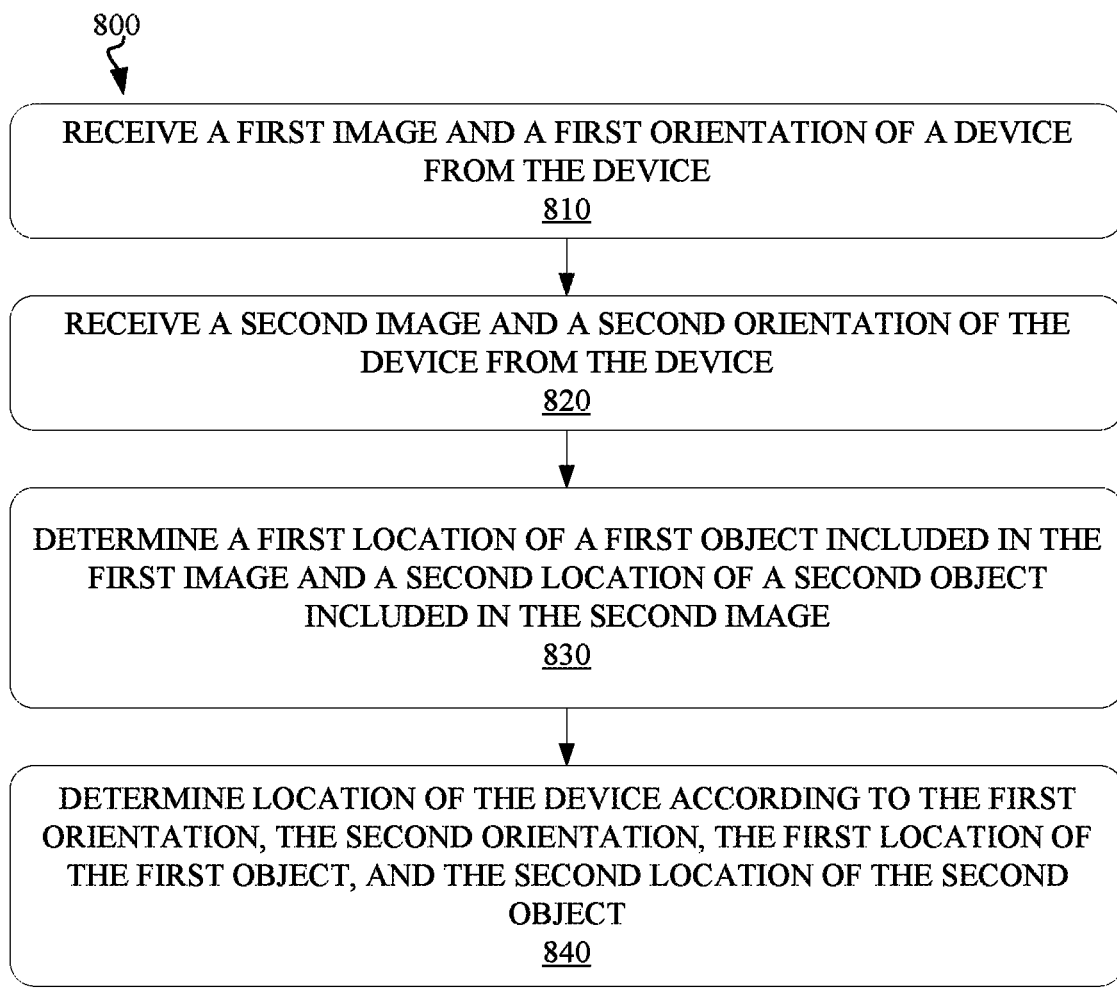
FIG. 8 is a flowchart of another example method for positioning according to an embodiment of the present disclosure.

FIG. 8 is a flowchart of another example method 800 for positioning according to an embodiment of the present disclosure. According to various embodiments of the present disclosure, the method 800 can be executed by the device 410, or another device near the device 410. In another example, the method 800 can be executed at a local or remote server in communication with the device 410 over one or more networks. In some circumstances, the method can be implemented jointly by one or more of the device 410, another device near the device 410, and a local or remote server.

At block 810, a first image, captured by a device, can be received from the device. A first orientation of the device can be received from the device as well. At block 820, a second image, captured by the device, can be received from the device, and a second orientation of the device can be received as well.

In an example, the first image and the second image can be obtained using the photographing apparatus of the device and transmitted to a remote server over one or more networks. The at least two images can be obtained at a same location, or at two locations generally near enough to one another to be considered a singular location by a positioning system. The first orientation can be an angle between the axial direction of the device and a reference direction when photographing the first object using the photographing apparatus. The second orientation can be an angle between the axial direction of the device and a reference direction when photographing the second object.

At block 830, a first location of a first object included in the first image and a second location of a second object included in the second image can be determined from a database of object locations. At block 840, the location of the device can be determined according to the first orientation, the second orientation, the first location of the first object and the second location of the second object. The location of the device may be transmitted to the device over one or more networks.

It is to be understood that sequences of these steps (obtaining receiving first image, receiving the second image, determining the first orientation, determining the second orientation, determining the first location, determining the second location etc.) are optional. For example, the step of receiving the first orientation or receiving the second orientation can be implemented before, simultaneously or after the step of receiving the first image or receiving the second image. The step of determining the first location or determining the second location can also be implemented before, simultaneously or after the step of receiving the first orientation or receiving the second orientation.

According to another embodiment of the present disclosure, there is provided a computer system. The computer system comprises a processor and a computer-readable memory coupled to the processor. The memory comprises instructions that when executed by the processor perform actions of: obtaining a first image using a device and determining a first orientation of the device; obtaining a second image using the device and determining a second orientation of the device; determining a first location of a first object included in the first image and a second location of a second object included in the second image; and determining the location of the device according to the first orientation, the second orientation, the first location of the first object and the second location of the second object.

According to another embodiment of the present disclosure, there is provided a computer program product. The computer program product comprises a computer readable storage medium having program instructions embodied therewith, the program instructions executable by a processor to cause the processor to: obtain a first image using a device and determine a first orientation of the device; obtain a second image using the device and determine a second orientation of the device; determine a first location of a first object included in the first image and a second location of a second object included in the second image; and determine the location of the device according to the first orientation, the second orientation, the first location of the first object and the second location of the second object.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for returning a location for a device, the method comprising:
   receiving a first image captured by a device and a first orientation of the device from the device over one or more networks;
   receiving a second image captured by the device and a second orientation of the device from the device over the one or more networks;
   determining a first location of a first object included in the first image and a second location of a second object included in the second image, the first location and the second location obtained using a database of object locations, wherein the second object is different from the first object;
   determining a device location of the device according to the first orientation, the second orientation, the first location of the first object and the second location of the second object; and
   transmitting the device location to the device;
   wherein determining the device location comprises:
      determining, in a coordinate system, a first line with a first angle between the first line and a first axis of the coordinate system based on the first orientation, the first line passing a first point corresponding to the first location of the first object, wherein the first point corresponds to an origin of the coordinate system;
      determining, in the coordinate system, a second line with a second angle between the second line and the first axis based on the second orientation, the second line passing a second point corresponding to the second location of the second object; and
      determining the device location of the device based on an intersection point of the first line and the second line in the coordinate system.

2. The computer-implemented method according to claim 1, wherein determining the device location comprises:
   determining, in the coordinate system, three points selected from the group consisting of: the origin, the second point, and the intersection point.

3. The computer-implemented method according to claim 1, wherein obtaining the first location and the second location comprises:
   performing image analysis of the first image and the second image to identify the first object and the second object;
   comparing the first object and the second object to the plurality of location images in the database; and
   matching the first object to at least one of the plurality of location images and the second object to at least one of the plurality of location images, the first location given by location data associated with the at least one location image matched to the first object and the second location given by location data associated with the at least one location image matched to the second object.

4. The computer-implemented method according to claim 1, wherein the first orientation and the second orientation received from the device are determined by the device using a sensor in the device.

5. The computer-implemented method according to claim 1, wherein the first angle is equal to the first orientation of the device and the second angle is equal to the second orientation of the device.

6. The computer-implemented method according to claim 1, wherein determining the device location is performed by a remote server and the method further comprises transmitting the device location to a device.

7. The computer-implemented method according to claim 1, wherein determining the device location is performed by the device and the method further comprises:
   displaying the device location on the device; receiving a third image of a third object from the device; and
   in response to being unable to obtain a location of the third object, presenting a notification to a user of the device.

8. A computer system for returning a location for a device, the system comprising:
   a processor; and
   a computer-readable memory coupled to the processor, the memory comprising instructions that when executed by the processor perform actions of:
      receiving a first image captured by a device and a first orientation of the device from the device over one or more networks;
      receiving a second image captured by the device and a second orientation of the device from the device over the one or more networks;
      determining a first location of a first object included in the first image and a second location of a second object included in the second image, the first location and the second location obtained using a database of object locations, wherein the second object is different from the first object;
      determining a device location of the device according to the first orientation, the second orientation, the first location of the first object and the second location of the second object; and
      transmitting the device location to the device;
   wherein determining the device location comprises:
      determining, in a coordinate system, a first line with a first angle between the first line and a first axis of the coordinate system based on the first orientation, the first line passing a first point corresponding to the first location of the first object, wherein the first point corresponds to an origin of the coordinate system;
      determining, in the coordinate system, a second line with a second angle between the second line and the first axis based on the second orientation, the second line passing a second point corresponding to the second location of the second object; and
      determining the device location of the device based on an intersection point of the first line and the second line in the coordinate system.

9. The computer system according to claim 8, wherein determining the device location comprises:
   determining, in the coordinate system, three points selected from the group consisting of: the origin, the second point, and the intersection point.

10. The computer system according to claim 8, wherein obtaining the first location and the second location comprises:
   performing image analysis of the first image and the second image to identify the first object and the second object;
   comparing the first object and the second object to the plurality of location images in the database; and
   matching the first object to at least one of the plurality of location images and the second object to at least one of the plurality of location images, the first location given by location data associated with the at least one location image matched to the first object and the second location given by location data associated with the at least one location image matched to the second object.

11. The computer system according to claim 8, wherein the first orientation and the second orientation received from the device are determined by the device using a sensor in the device.

12. The computer system according to claim 8, wherein the first angle is equal to the first orientation of the device and the second angle is equal to the second orientation of the device.

13. The computer system according to claim 8, wherein the first object is identified in the first image according to a user input.

14. The computer system according to claim 8, the actions further comprise:
   receiving a third image of a third object from the device; and
   in response to being unable to obtain a location of the third object, presenting a notification to a user of the device.

15. A computer program product, comprising a non-transitory computer readable storage medium having program instructions embodied therewith, the program instructions executable by a processor to cause the processor to:
   receive a first image captured by a device and a first orientation of the device from the device over one or more networks;
   receive a second image captured by the device and a second orientation of the device from the device over the one or more networks;
   determine a first location of a first object included in the first image and a second location of a second object included in the second image, the first location and the second location obtained using a database of object locations, wherein the second object is different from the first object;
   determine a device location of the device according to the first orientation, the second orientation, the first location of the first object and the second location of the second object; and transmit the device location to the device;
   wherein the program instructions cause the processor to determine the device location by:
   determining, in a coordinate system, a first line with a first angle between the first line and a first axis of the coordinate system based on the first orientation, the first line passing a first point corresponding to the first location of the first object, wherein the first point corresponds to an origin of the coordinate system;
   determining, in the coordinate system, a second line with a second angle between the second line and the first axis based on the second orientation, the second line passing a second point corresponding to the second location of the second object; and
   determining the device location of the device based on an intersection point of the first line and the second line in the coordinate system.

16. The computer program product according to claim 15, wherein determining the device location comprises:
   determining, in the coordinate system, three points selected from the group consisting of: the origin, the second point, and the intersection point.

17. The computer program product according to claim 15, wherein the program instructions to determine the first location and the second location comprise:
   perform image analysis of the first image and the second image to identify the first object and the second object;
   compare the first object and the second object to the plurality of location images in the database; and
   match the first object to at least one of the plurality of location images and the second object to at least one of the plurality of location images, the first location given by location data associated with the at least one location image matched to the first object and the second location given by location data associated with the at least one location image matched to the second object.

18. The computer program product according to claim 15, wherein the first angle is equal to the first orientation of the device and the second angle is equal to the second orientation of the device.

19. A computer-implemented method for returning a location for a device, the method comprising:
   transmitting a first image captured by a device and a first orientation of the device to a server over one or more networks;
   transmitting a second image captured by the device and a second orientation of the device to a server over the one or more networks;
   receiving over the one or more networks a first location of a first object included in the first image and a second location of a second object included in the second image, the first location and the second location obtained using a database of object locations, wherein the second object is different from the first object;
   determining, in a coordinate system, a first line with a first angle between the first line and a first axis of the coordinate system based on the first orientation, the first line passing a first point corresponding to the first location of the first object, wherein the first point corresponds to an origin of the coordinate system;
   determining, in the coordinate system, a second line with a second angle between the second line and the first axis based on the second orientation, the second line passing a second point corresponding to the second location of the second object; and
   determining the device location of the device based on an intersection point of the first line and the second line in the coordinate system.

20. The computer-implemented method according to claim 19, wherein determining the device location comprises:
   determining, in the coordinate system, three points selected from the group consisting of: the origin, the second point, and the intersection point.

\* \* \* \* \*